(12) United States Patent
Liang et al.

(10) Patent No.: US 12,407,263 B2
(45) Date of Patent: Sep. 2, 2025

(54) BACK-END ENERGY STORAGE ISOLATION FLY-BACK CONVERSION APPARATUS

(71) Applicant: WISETOP TECHNOLOGY CO., LTD., Hsinchu (TW)

(72) Inventors: Wei-Chen Liang, Hsinchu (TW); Pin Chang, Hsinchu (TW)

(73) Assignee: WISETOP TECHNOLOGY CO., LTD., Hsinchu (TW)

( * ) Notice: Subject to any disclaimer, the term of this patent is extended or adjusted under 35 U.S.C. 154(b) by 218 days.

(21) Appl. No.: 18/487,407

(22) Filed: Oct. 16, 2023

(65) Prior Publication Data
US 2024/0136933 A1 Apr. 25, 2024
US 2024/0235402 A9 Jul. 11, 2024

(30) Foreign Application Priority Data
Oct. 20, 2022 (TW) .................................. 111211441

(51) Int. Cl.
*H02M 3/335* (2006.01)
*H02M 3/00* (2006.01)

(52) U.S. Cl.
CPC ......... *H02M 3/33569* (2013.01); *H02M 3/01* (2021.05); *H02M 3/33507* (2013.01); *H02M 3/33571* (2021.05)

(58) Field of Classification Search
CPC ............... H02M 3/01; H02M 3/33507; H02M 3/33569; H02M 3/33571
See application file for complete search history.

(56) References Cited

U.S. PATENT DOCUMENTS 6,317,341 B1 * 11/2001 Fraidlin .................. H02M 3/01
363/21.04
7,920,391 B1 * 4/2011 Vinciarelli ........ H02M 3/33569
363/17
(Continued)

FOREIGN PATENT DOCUMENTS

CN 109451628 A 3/2019
WO 2019219136 A1 11/2019

OTHER PUBLICATIONS

Report dated Mar. 5, 2024 of the corresponding European patent application No. 23202615.3.
(Continued)

*Primary Examiner* — Gary A Nash
(74) *Attorney, Agent, or Firm* — MUNCY, GEISSLER, OLDS & LOWE, P.C.

(57) ABSTRACT

A back-end energy storage isolation fly-back conversion apparatus (10) includes a return switch (Q1), a driving switch (Q2), an energy storage capacitor (Cs), a transformer (T1), a resonant inductor (Lr), a first rectifier (104), an output capacitor (Cout), and a controller (116). The transformer (T1) includes a primary-side winding (Lm) and a secondary-side first winding (102). The return switch (Q1) is turned on by the controller (116), so that the energy storage capacitor (Cs) is charged by a primary-side current (I1) flowing through the resonant inductor (Lr), the primary-side winding (Lm), and the return switch (Q1), and the secondary-side first winding (102) is powered by the primary-side current (I1). When the primary-side current (I1) becomes negative, the energy storage capacitor (Cs) discharges through the return switch (Q1) and the primary-side winding (Lm) and continuously supplies power to the secondary-side first winding (102).

9 Claims, 13 Drawing Sheets

(56) References Cited

U.S. PATENT DOCUMENTS

| | | | |
|---|---|---|---|
| 8,791,591 B1 * | 7/2014 | Vinciarelli | H02M 3/1582 |
| | | | 323/267 |
| 2020/0169180 A1 * | 5/2020 | Jitaru | H02M 3/33592 |
| 2021/0399643 A1 | 12/2021 | Oh | |

OTHER PUBLICATIONS

Office Action dated Dec. 5, 2024 of the corresponding Korean patent application No. 10-2023-0129102.

* cited by examiner

US 12,407,263 B2

BACK-END ENERGY STORAGE ISOLATION FLY-BACK CONVERSION APPARATUS

BACKGROUND OF THE DISCLOSURE

Technical Field

The present disclosure relates to a fly-back conversion apparatus, and especially relates to a back-end energy storage isolation fly-back conversion apparatus.

Description of Related Art

In modern life, power electricity outputted from an AC power source (for example, a wall socket) is usually rectified, power factor corrected, and converted before being suited for use at the consumer end. At present, there are various types of switching power converters, such as forward, fly-back, buck, boost, buck-boost, resonance, and so on for DC to DC conversion; and boost fly-back PFC, Totem-Pole PFC, synchronized rectifier, and so on for AC to DC conversion.

Unfortunately, each of the above-mentioned switching power converters can only perform step-up or step-down operations despite the variety of switching power converters available.

SUMMARY OF THE DISCLOSURE

In order to solve the above-mentioned problems, an object of the present disclosure is to provide a back-end energy storage isolation fly-back conversion apparatus.

In order to achieve the object of the present disclosure mentioned above, the back-end energy storage isolation fly-back conversion apparatus of the present disclosure includes a return switch, a driving switch, an energy storage capacitor, a transformer, a resonant inductor, a first rectifier, an output capacitor, and a controller. The driving switch is electrically connected to the return switch. The energy storage capacitor is electrically connected to the return switch. The transformer is electrically connected to the return switch and the driving switch. The transformer includes a primary-side winding and a secondary-side first winding. The resonant inductor is electrically connected to the primary-side winding. The first rectifier is electrically connected to the secondary-side first winding. The output capacitor is electrically connected to the first rectifier. The controller is electrically connected to the return switch and the driving switch. Moreover, the return switch is turned on by the controller, so that the energy storage capacitor is charged by a primary-side current flowing through the resonant inductor, the primary-side winding, and the return switch, and the secondary-side first winding is powered by the primary-side current. When the primary-side current becomes negative, the energy storage capacitor discharges through the return switch and the primary-side winding and continuously supplies power to the secondary-side first winding.

The advantage of the present disclosure is to step up (boost) and step down (buck) the voltage in a wide range.

Please refer to the detailed descriptions and figures of the present disclosure mentioned below for further understanding technologies, methods, and effects and achieving the predetermined purposes of the present disclosure. With the descriptions and figures, the purposes, characteristics, and features of the present disclosure may be well understood.

However, the drawings are provided only for references and descriptions and not intended to limit the scope of the present disclosure.

DETAILED DESCRIPTION

Figure 1:
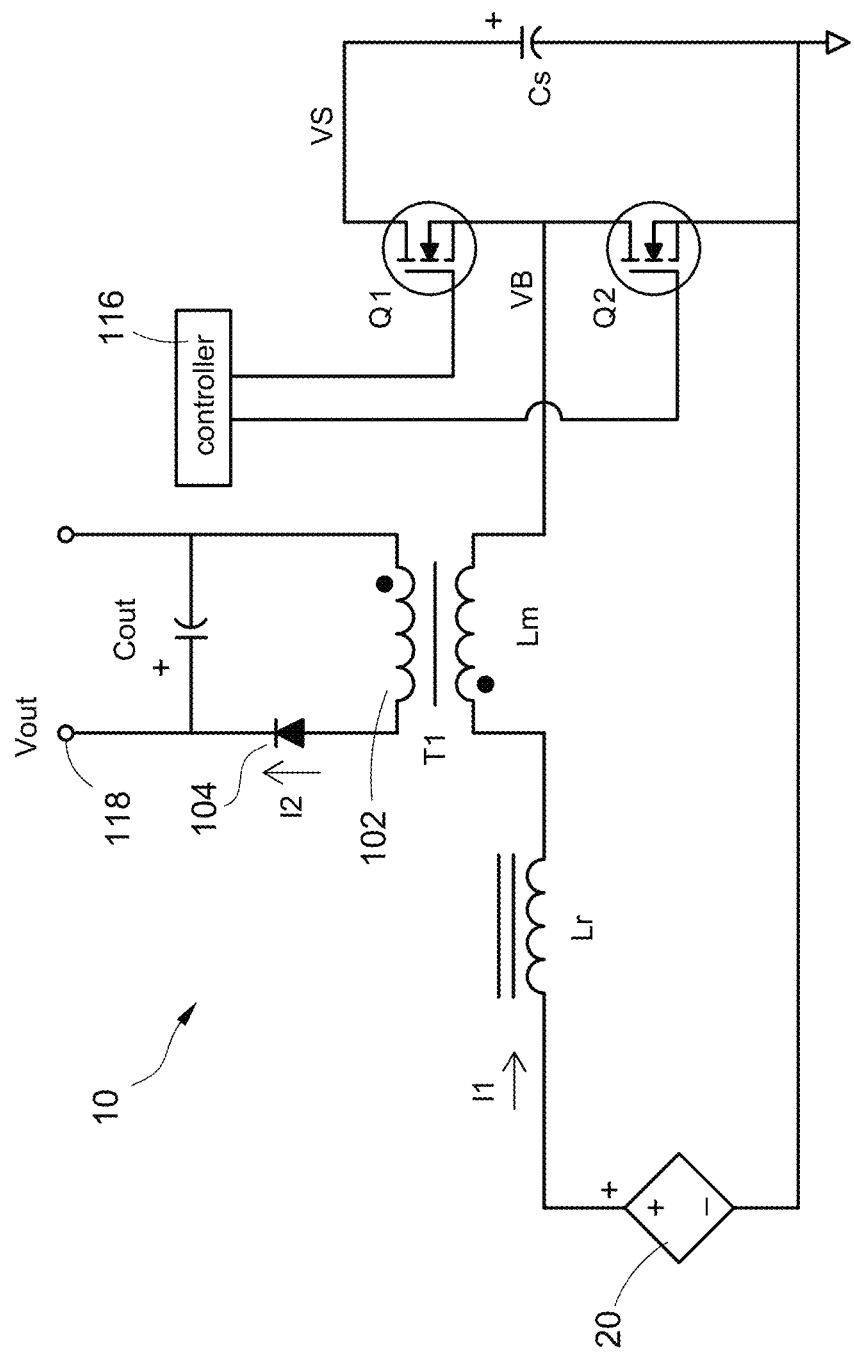
FIG. 1 shows a circuit block diagram of the back-end energy storage isolation fly-back conversion apparatus according to a first embodiment of the present disclosure.

In the present disclosure, numerous specific details are provided, to provide a comprehensive understanding of embodiments of the present disclosure. It will be understood by those skilled in the art that the present disclosure may be practiced without one or more of these specific details. In other instances, well-known details are not shown or described to avoid obscuring aspects of the present disclosure. The technical content and the detailed description of the present disclosure are as follows with reference to the drawing figures.

First of all, the basic structure of the present disclosure may be referred to as a storage-boosted isolated fly-back (abbreviated as SBIF) DC-DC converter. The main concept of the present disclosure is "back-end energy storage". In order to meet the requirements of low-voltage operation, the present disclosure basically utilizes the structure of "boost and energy storage". In general, the inductor in an electrical circuit may be likened to the (inertial) mass of a mechanical system, while the capacitor may be likened to a spring. Therefore, the design concept of the back-end energy storage is to make the input power supply drive the current of the inductor (mass), and this current may be received by the capacitor (spring) and converted into potential energy. This potential energy may be higher than the voltage of the input power supply. When discharging through a return switch, the energy of the energy storage capacitor drives the secondary side to output, which is not directly limited by the voltage of the power supply. In general, a high-voltage end of a boost circuit is an output end. In the present disclosure, a back-end energy storage capacitor is placed at the back end of the boost circuit, and then a rectified output is implemented by an inductor at the secondary side. The present disclosure utilizes the fly-back mode, which stores a part of the energy in the inductor core, and then transmits the energy to the (isolated) secondary side through the fly-back stage. The primary side and the secondary side of the transformer often utilize different coil turns, and the voltage on one side of the transformer will be reflected on the other side by the turn ratio. Therefore, when describing the high-low comparison between the input voltage and the output voltage, in fact, it has implicitly assumed that the effect of the turn ratio is taken into account. In addition, the actual transformers have magnetization inductance and leakage inductance. The series-connected resonant inductor Lr described below in the present disclosure may sometimes directly use the leakage inductance of the transformer to achieve the effect of the resonant inductor without an additional independent inductive element.

The switches described in the following embodiments of the present disclosure use N-MOSFET, wherein MOS is a switch. When the MOS is not turned on, since there is an internal body diode (or parasitic diode), the MOS is still conductive in one direction (for example, in a direction from the source to the drain for N-MOSFET). Other switch elements, such as the insulated gate bipolar transistor (IGBT), GaN, or SiC of power systems, are now quite common and may replace MOSFET as a switch. Furthermore, when a driven voltage between the gate and the source of the N-MOSFET is a high potential voltage, the N-MOSFET will be turned on. Therefore, in the following timing waveform diagrams of the present disclosure, in order to display the control timing of these switches conveniently, the voltage of the control signal is slightly adjusted in the present disclosure, but that does not affect the control logic. The purpose of the timing waveform diagrams below in the present disclosure is to illustrate the basic working principle of the circuit in a specific case, so the selection of the specific case is mainly for the convenience of explanation, and it does not mean that this circuit architecture may only be limited for such usage.

The horizontal axis of the timing waveform diagrams below in the present disclosure is time, the unit is second, and u represents microsecond. The time is counted from the start of the simulation, so the absolute value has no special meaning. For the voltage signals, the unit of the vertical axis is volts; for the current signals, the unit of the vertical axis is amperes.

The diodes in the diagrams of the present disclosure are for rectification (unidirectional conduction), and the use of the diodes in the diagrams is only for simplicity and ease of understanding. The diodes in the diagrams of the present disclosure are rectifiers, and all the rectifier diodes in the present disclosure may be replaced by rectifier switches, and their control sequence must be synchronized with the direction of the current, namely, the so-called synchronous rectification. The technology of the synchronous rectification is well-developed at present, and the rectifier described in the present disclosure may be implemented by diodes or synchronous switches.

The controller described in the following embodiments of the present disclosure controls the operations of the entire circuit by controlling the timing (the gate voltage timing) of these switches, and then adjusts (namely, feedback controls) the timing of these switches at any time by detecting the voltage and the current at key nodes on the circuit, so as to achieve the effect of the closed-loop dynamic control. The controller is usually integrated in a single chip IC to generate switch control signals to control the actions of these switches. However, the control functions do not necessarily need to be concentrated in the same block; that is, the control functions (for example, the functions of detection, determination, and generation of control signals) may be achieved by several control blocks (referred to as distributed control).

The power supply apparatus in the diagrams of the present disclosure may provide DC (direct current) power (or voltage) or AC (alternating current) power (or voltage); here, DC power (or voltage) refers to "a power (or voltage) that maintains same voltage polarity". Alternatively, the DC power (or voltage) may be a rectified power (or voltage). For example, after a sinusoidal-wave mains is rectified, the power (or voltage) amplitude still changes with time. However, since the frequency (such as 60 Hz) of the mains is much lower than the switching frequency (such as 60 kHz) of the switches, the polarity will not change, so instantaneous power (or voltage) may be regarded as the DC power (or voltage).

FIG. 1 shows a circuit block diagram of the back-end energy storage isolation fly-back conversion apparatus 10 according to a first embodiment of the present disclosure. The back-end energy storage isolation fly-back conversion apparatus 10 of the present disclosure is applied to a power supply apparatus 20. The back-end energy storage isolation fly-back conversion apparatus 10 includes a return switch Q1, a driving switch Q2, a controller 116, an energy storage capacitor Cs, a transformer T1, a resonant inductor Lr, a first rectifier 104, an output capacitor Cout, and a power output end 118. The transformer T1 includes a primary-side winding Lm and a secondary-side first winding 102. Moreover, the return switch Q1, the driving switch Q2, the controller 116, the energy storage capacitor Cs, the primary-side winding Lm, the resonant inductor Lr, and the power supply apparatus 20 are electrically connected to each other, and are generally referred to as a primary-side circuit. The secondary-side first winding 102, the first rectifier 104, the output capacitor Cout, and the power output end 118 are electrically connected to each other and are generally referred to as a secondary-side circuit.

In an embodiment of the present disclosure but not limiting the present disclosure: one end of the driving switch Q2 is directly connected to one end of the return switch Q1; one end of the energy storage capacitor Cs is directly connected to the other end of the return switch Q1; the other end of the energy storage capacitor Cs is directly connected to the other end of the driving switch Q2; one end of the primary-side winding Lm is directly connected to the one end of the return switch Q1 and the one end of the driving switch Q2; the resonant inductor Lr is directly connected in series with the primary-side winding Lm, or the resonant inductor Lr is a leakage inductance of the primary-side winding Lm; one end of the first rectifier 104 is directly connected to one end of the secondary-side first winding 102; one end of the output capacitor Cout is directly connected to the other end of the first rectifier 104; the other end of the output capacitor Cout is directly connected to the other end of the secondary-side first winding 102. Furthermore, in one embodiment of the present disclosure, since the leakage inductance of the transistor is an equivalent self-inductance in series, the resonant inductor Lr is absent, and the resonant inductor Lr is replaced by the leakage inductance of the primary-side winding Lm of the transformer T1. For the resonant converter, it is very common to use the leakage inductance to participate in the resonant behavior of the circuit, such as the so-called LLC architecture.

The power output end 118 is connected to a load (not shown in FIG. 1). The back-end energy storage isolation fly-back conversion apparatus 10 converts a DC voltage (not shown in FIG. 1) provided by the power supply apparatus 20 into an output voltage Vout, and transmits the output voltage Vout to the load. A first voltage VB is at a common-connected node between the return switch Q1 and the driving switch Q2, which is a voltage driven by the half-bridge switches. A second voltage VS is at a common-connected node between the return switch Q1 and the energy storage capacitor Cs.

Figure 2:
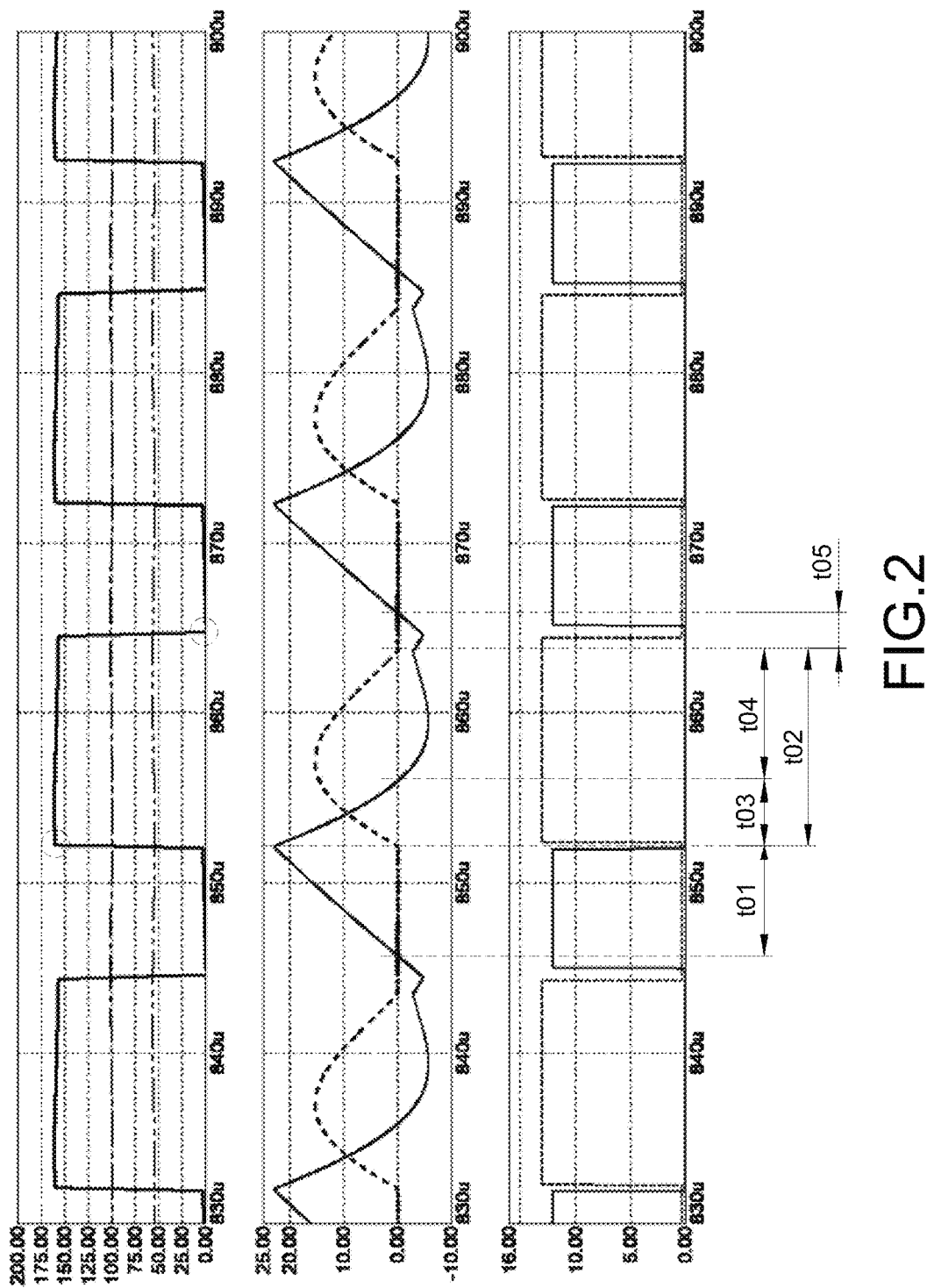
FIG. 2 shows a timing waveform diagram of the back-end energy storage isolation fly-back conversion apparatus according to the first embodiment of the present disclosure.

FIG. 2 shows a timing waveform diagram of the back-end energy storage isolation fly-back conversion apparatus 10 according to the first embodiment of the present disclosure, and also refer to FIG. 1. In FIG. 2, the top timing waveform diagram is a voltage timing diagram, wherein the solid line is the first voltage VB, the single-pointed dotted line is the DC voltage provided by the power supply apparatus 20, and the double-pointed dotted line is the output voltage Vout (namely, the isolated low output voltage). The middle timing waveform diagram is a current timing diagram, wherein the solid line is the primary-side current I1, because of current-continuity, that is the same current across the bridge, and the dotted line is the secondary-side current I2. The bottom timing waveform diagram is a control timing diagram, wherein the solid line is a signal of controlling the driving switch Q2, and the dotted line is a signal of controlling the return switch Q1.

Please refer to both FIG. 1 and FIG. 2, the steady-state operation of the back-end energy storage isolation fly-back conversion apparatus 10 according to the first embodiment of the present disclosure includes the following 10 steps in sequence.

1. The previous primary-side current I1 (in this step, the primary-side current I1 is a negative current) drives the body diode of the driving switch Q2 to be conducted, and the first voltage VB is about −1 volt (about the forward conduction voltage of the body diode). The primary-side current I1 flowing from the power supply apparatus 20 to the resonant inductor Lr is referred to as the positive current (from left to right in FIG. 1); the primary-side current I1 flowing from the resonant inductor Lr to the power supply apparatus 20 is referred to as the negative current (from right to left in FIG. 1).

2. The driving switch Q2 is turned on by the controller 116, and the DC voltage provided by the power supply apparatus 20 drives the primary-side current I1 to gradually change from a negative current to an increasing positive current.

3. The dotted position of the primary-side winding Lm in FIG. 1 is a positive-voltage position, and the secondary side is blocked by the first rectifier 104. Energy is stored in the primary-side winding Lm and the resonant inductor Lr.

4. When a predetermined condition (for example, determined based on time or the primary-side current I1) is reached, the controller 116 turns off the driving switch Q2.

5. The freewheeling (namely, continually flowing) electromotive force of the primary-side winding Lm flies back to keep the current continue flowing, the secondary side is turned on, and the energy is transferred and outputted to the secondary side.

6. The primary-side current I1 forces the first voltage VB to be slightly higher than the second voltage VS (namely, across a diode forward voltage of about 1V), and the primary-side current I1 charges the energy storage capacitor Cs, stores energy and maintains the bridge with a high enough voltage across the output voltage of the secondary side.

7. The return switch Q1 is turned on by the controller 116, and the primary-side current I1 charges the energy storage capacitor Cs and supplies power to the secondary side due to the boosted voltage, so the primary-side current I1 decreases rapidly. In this step, in more detail, the return switch Q1 is turned on, so that the energy storage capacitor Cs is charged by the primary-side current I1 flowing through the resonant inductor Lr, the primary-side winding Lm, and the return switch Q1, and the secondary-side first winding 102 is powered by the primary-side current I1.

8. The primary-side current I1 becomes negative. At this time, the energy storage capacitor Cs discharges, so as to continuously supply power to the secondary side. In this step, in more detail, when the primary-side current I1 becomes negative, the energy storage capacitor Cs discharges through the return switch Q1 and the primary-side winding Lm and continuously supplies power to the secondary-side first winding 102.

9. When the primary-side current I1 is nearing its end (based on time, such as the half cycle of the resonant inductor Lr and the energy storage capacitor Cs, or based on the primary-side current I1, or other conditions), the controller 116 turns off the return switch Q1.

10. The residual primary-side current I1 (in this step, the primary-side current I1 is a negative current) forces the first voltage VB to −1 volt to keep flowing, and then the process returns to the first step mentioned above.

Furthermore, with regard to the above-mentioned seventh step and the eighth step, using the controller to turn on the MOSFET switch by, for example, a PWM signal should belong to the known technology. Although the present disclosure discloses that the controller 116 is used to turn on the return switch Q1, the present disclosure is not limited thereto, that is, the return switch Q1 can be turned on without the controller 116. For example, an appropriate high-potential voltage supplies between the gate and the source of the above-mentioned N-MOSFET to drive the N-MOSFET be turned on, which also belongs to the known technology. After the return switch Q1 is turned on, by the circuit layout and component arrangement in FIG. 1 of the present disclosure, the remainder of the seventh step and the eighth step may be performed.

Please refer to FIG. 2 again. The first time interval t01 is a driving stage. In the driving stage, the driving switch Q2 is turned on by the controller 116, the power supply apparatus 20 supplies power, and the primary-side winding Lm and the resonant inductor Lr store energy. The second time interval t02 is a transmission stage. In the transmission stage, the return switch Q1 is turned on by the controller 116, and the energy is transmitted to the secondary side. The second time interval t02 may be subdivided into the third time interval t03 and the fourth time interval t04. In the third time interval t03, the primary-side current I1 continuously flows and drives the secondary-side current I2, and simultaneously stores energy in the energy storage capacitor Cs. In the fourth time interval t04, the energy storage capacitor Cs continuously supplies power to the secondary side. In the fifth time interval t05, the energy of the transformer T1 has been completely released, no energy is transmitted to the secondary side, and the primary-side current I1 continuously flows.

The present disclosure includes the following effects, characteristics, and advantages:

1. The present disclosure provides the innovative boost-type back-end energy storage architecture; the energy storage capacitor Cs may adjust the driving voltage to the secondary side, so as to achieve the driving function at extremely low voltage.

2. The large capacitor (namely, the output capacitor Cout) is arranged on the secondary side, so that the inrush current is eliminated.

3. The present disclosure may reliably achieve the zero voltage switching, as shown by the dotted circle in the top timing waveform diagram in FIG. 2.

4. The present disclosure may provide the low voltage output.

5. The present disclosure may step up (boost) and step down (buck) the voltage in a wide range to be more suitable for the power factor correction. The present disclosure discloses the buck-boost type (while the conventional converter is only a boost-type or a buck-type), so the output of the PFC may be set at a convenient voltage.

6. The inductor directly connects to the input power, so that the Totem-Pole PFC may be achieved (which is not achieved by the conventional converters), that is, by controlling the timing (for example, the duty cycles) of these switches, the energy may be efficiently and controllably transmitted from the primary side (i.e., the power input side) to the second side (i.e., the output side) regardless of the input voltage being higher or lower than the output voltage.

Figure 3:
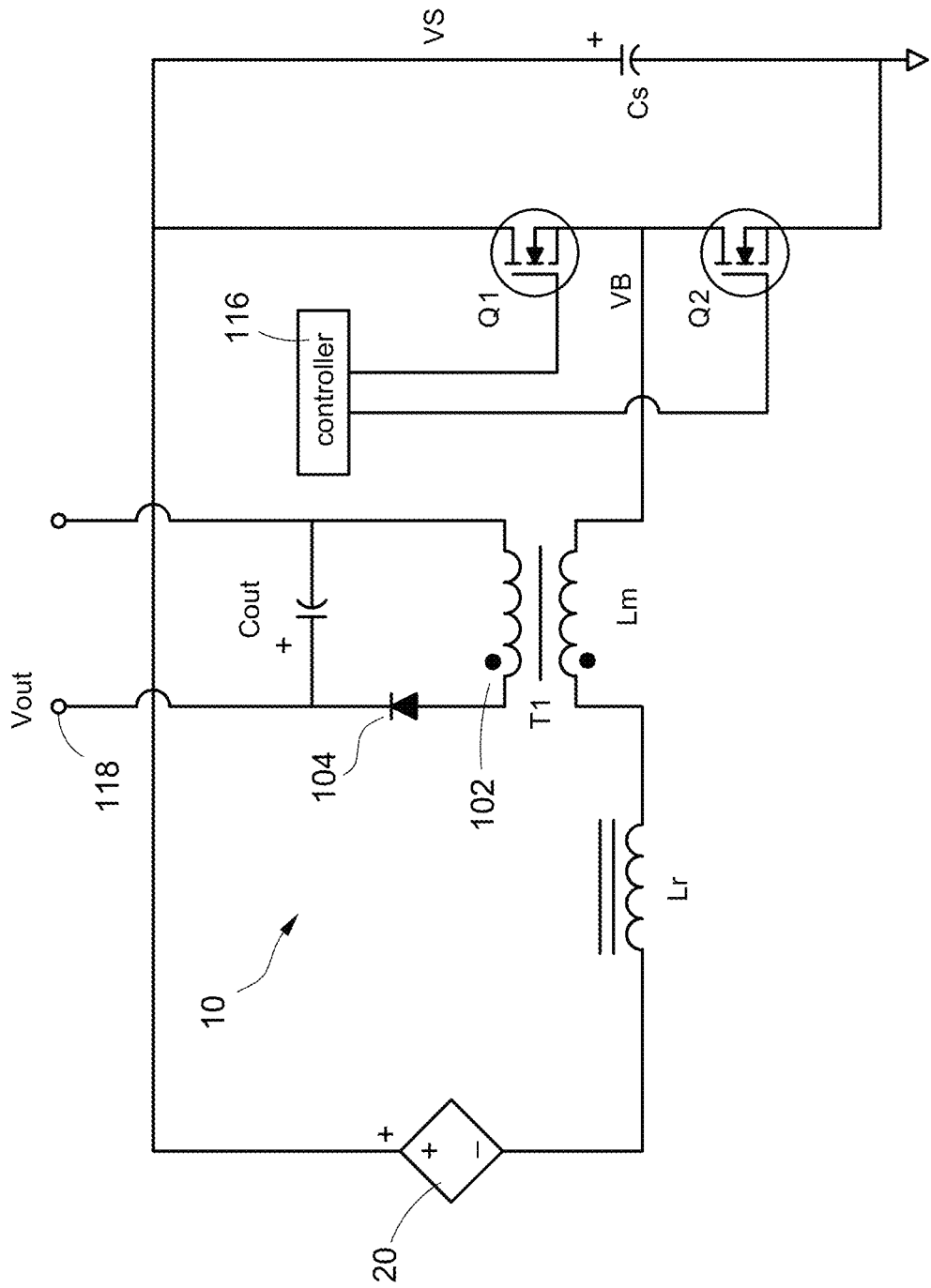
FIG. 3 shows a circuit block diagram of the back-end energy storage isolation fly-back conversion apparatus according to a second embodiment of the present disclosure.

FIG. 3 shows a circuit block diagram of the back-end energy storage isolation fly-back conversion apparatus 10 according to a second embodiment of the present disclosure. The descriptions of the elements shown in FIG. 3 which are the same as the elements shown in FIG. 1 are not repeated here for brevity. The above-mentioned embodiment of FIG. 1 may be referred to as the basic type, and the embodiment of FIG. 3 is a symmetrical type of the basic type, and therefore the principle is the same but the direction of the secondary-side winding is opposite, wherein the roles of the switch Q1 and the switch Q2 are exchanged, namely, in FIG. 3, the switch Q2 is the return switch, and the switch Q1 is the driving switch.

Figure 4:
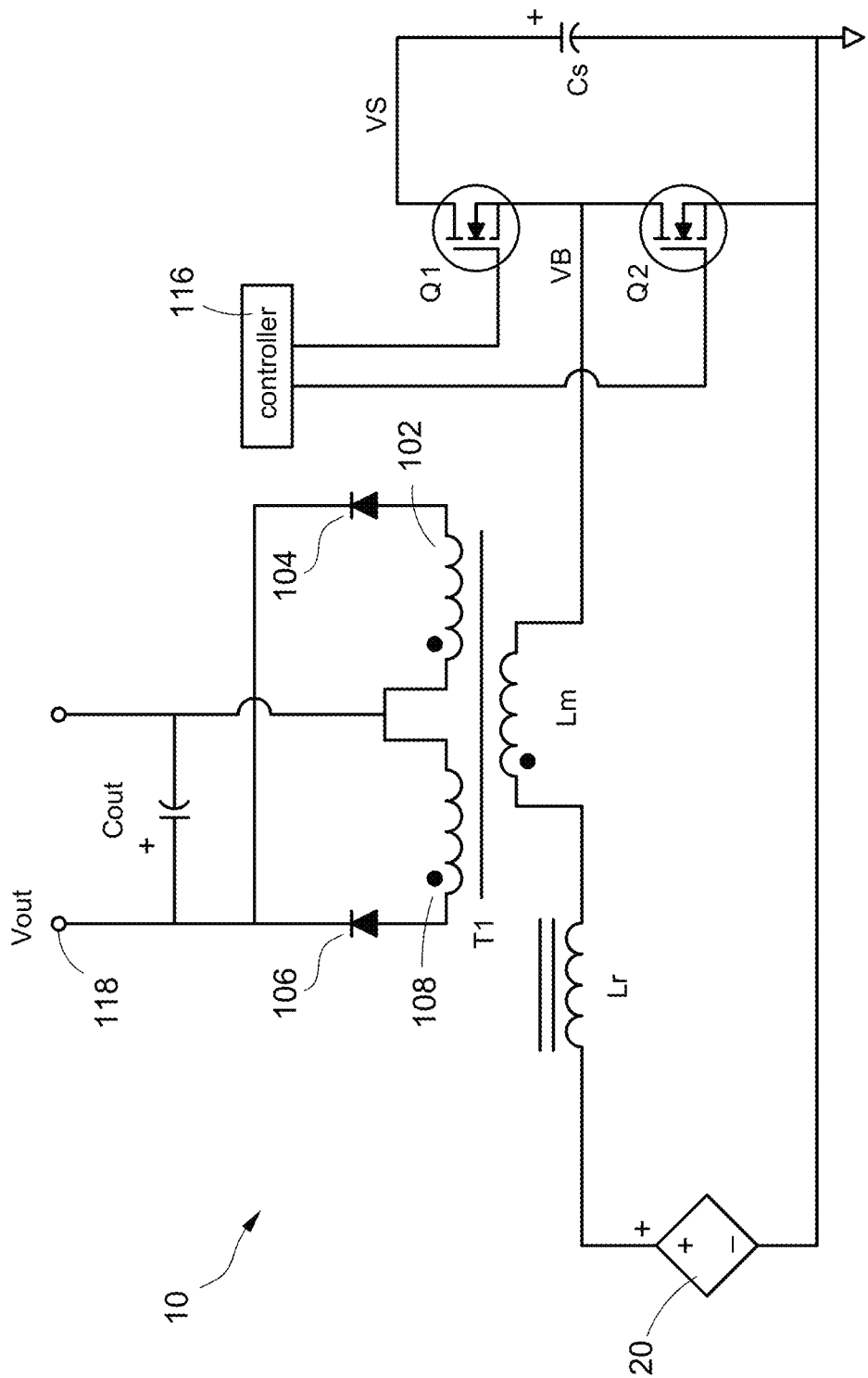
FIG. 4 shows a circuit block diagram of the back-end energy storage isolation fly-back conversion apparatus according to a third embodiment of the present disclosure.

FIG. 4 shows a circuit block diagram of the back-end energy storage isolation fly-back conversion apparatus 10 according to a third embodiment of the present disclosure. The descriptions of the elements shown in FIG. 4 which are the same as the elements shown in FIG. 1 are not repeated here for brevity. Moreover, the back-end energy storage isolation fly-back conversion apparatus 10 further includes a second rectifier 106 electrically connected to the output capacitor Cout and the first rectifier 104. The transformer T1 further includes a secondary-side second winding 108 electrically connected to the second rectifier 106. Moreover, the purpose of arranging the secondary-side second winding 108 is to perform the full-wave rectification on the secondary side of the transformer T1. Therefore, another embodiment of performing the full-wave rectification is to arrange a diode bridge directly behind the secondary-side first winding 102, which will have the same effect as the half-wave rectification performed by each of the two windings, namely, the secondary-side first winding 102 and the secondary-side second winding 108 in FIG. 4, such that the designer may choose any one of the two embodiments of performing the full-wave rectification.

The embodiment of FIG. 4 is a full-wave type of the basic type (FIG. 1), and therefore the principle is the same but it provides the full wave output. Due to the isolated output and zero voltage switching, and the characteristic of the storage boost, the control is more flexible, and the power factor correction may be directly performed. The advantage of the full-wave type of FIG. 4 is that when the power voltage is higher (namely, when the power voltage is higher than the output voltage reflected by the turn ratio on the primary side), both the forward driving and the return process may transfer power to the secondary side. However, when the power voltage is not high enough to forward drive the secondary-side current, the primary side may store energy in the inductance of the transformer. In the stage of the inductor freewheeling (to keep current continue flowing), it will transmit power to the secondary side as well as the power may also be transferred to the energy storage capacitor Cs. During the return process, the energy of the energy storage capacitor Cs will be transferred to the secondary side again.

Figure 5:
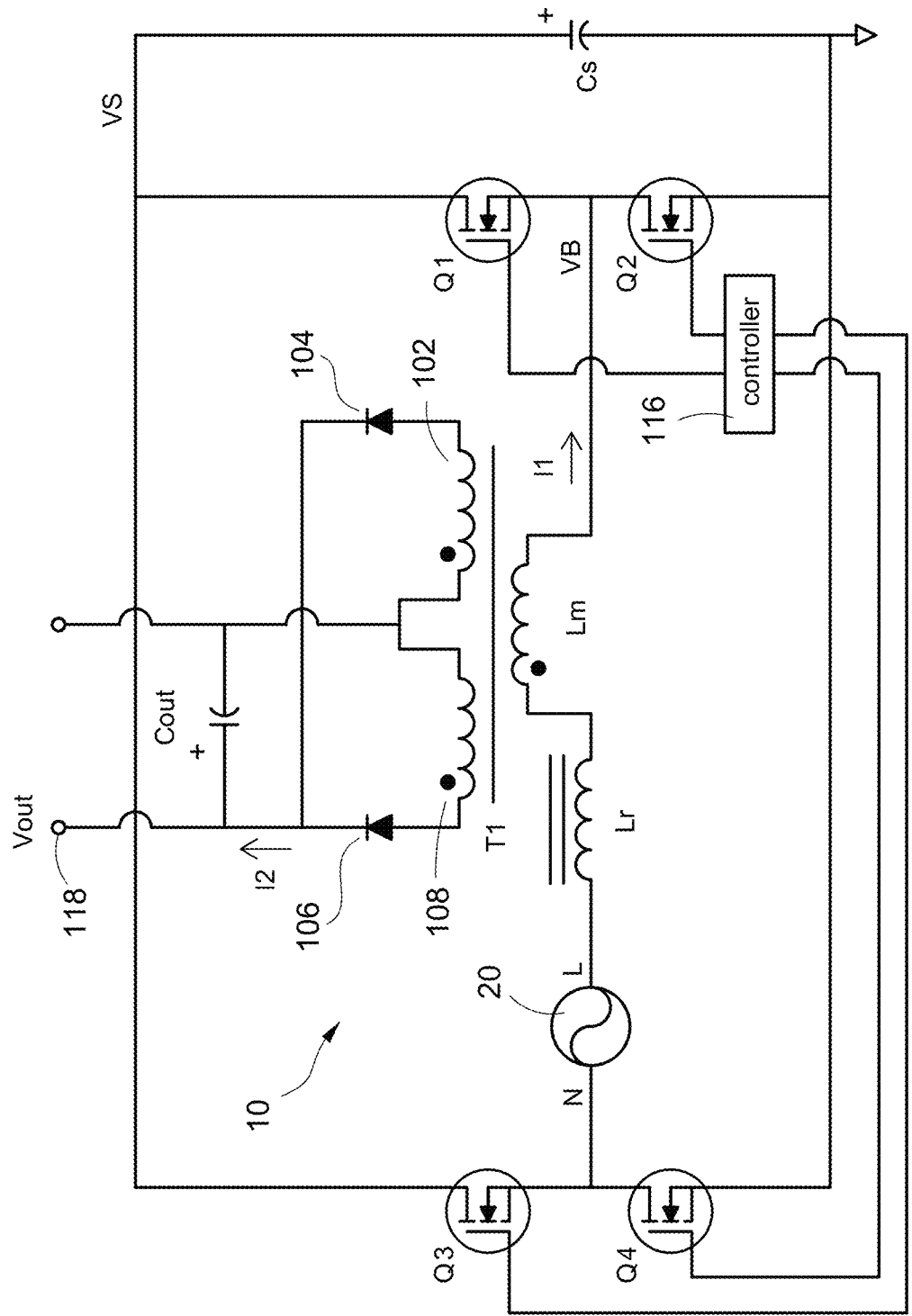
FIG. 5 shows a circuit block diagram of the back-end energy storage isolation fly-back conversion apparatus according to a fourth embodiment of the present disclosure.

By combining two symmetrical full-wave types, a back-end energy storage isolation power factor correction circuit can be obtained, as shown in FIG. 5. FIG. 5 shows a circuit block diagram of the back-end energy storage isolation fly-back conversion apparatus 10 according to a fourth embodiment of the present disclosure. The descriptions of the elements shown in FIG. 5 which are the same as the elements shown in FIG. 4 are not repeated here for brevity. Furthermore, the back-end energy storage isolation fly-back conversion apparatus 10 further includes a first auxiliary switch Q3 and a second auxiliary switch Q4. The first auxiliary switch Q3 is electrically connected to the return switch Q1 and the energy storage capacitor Cs. The second auxiliary switch Q4 is electrically connected to the first auxiliary switch Q3. The power supply apparatus 20 provides an AC voltage with a live line L and a neutral line N. With the basic structure and the concept of alternating positive and negative half cycles of the Totem-Pole PFC, the back-end energy storage is provided to achieve an isolated PFC.

The steady-state operation of the circuit in the fourth embodiment includes the following 10 steps in sequence. It is assumed that the AC voltage provided by the power supply apparatus 20 is in a positive half cycle, the live line L is positive, the neutral line N is negative, the second auxiliary switch Q4 is turned on, and the first auxiliary switch Q3 is blocked (namely, turned off).

1. The previous primary-side current I1 (in this step, the primary-side current I1 is a negative current) drives the body diode of the driving switch Q2 to be conducted, and the first voltage VB is about −1 volt.

2. The driving stage is performed. In the driving stage, the driving switch Q2 is turned on by the controller 116, the positive AC voltage provided by the power supply apparatus 20 drives the primary-side current I1 to increase linearly from negative current (and from negative to positive), and the primary-side current I1 increases continuously.

3. The dotted position of the primary-side winding Lm in FIG. 5 is a positive-voltage position. If the AC voltage provided by the power supply apparatus 20 is greater than the secondary-side voltage, the second rectifier 106 is turned on, the energy is transferred to the secondary side, and the energy is also stored in the primary-side winding Lm and the resonant inductor Lr.

4. When a predetermined condition (for example, determined based on time, the primary-side current I1, or the second voltage VS) is reached, the controller 116 turns off the driving switch Q2.

5. In a freewheeling stage, the primary-side winding Lm makes the electromotive force fly back, the first rectifier 104 is turned on, and the energy is continuously transmitted to the secondary-side output.

6. The primary-side current I1 forces the first voltage VB to be slightly higher than the second voltage VS (namely, across a diode forward voltage of about 1V), and the primary-side current I1 charges the energy storage capacitor Cs, stores energy and maintains the bridge with a high enough voltage across the output voltage of the secondary side.

7. The return switch Q1 is turned on by the controller 116, and the primary-side current I1 charges the energy storage capacitor Cs and supplies power to the secondary side due to the boosted voltage, so the primary-side current I1 decreases rapidly.

8. In a return stage, the primary-side current I1 becomes negative. At this time, the energy storage capacitor Cs discharges to continuously supply power to the secondary side, and a part of the energy is stored back to the input side; here, the part of the energy which is stored back to the input side (and the current returning toward the power supply side described later in the present disclosure) is the energy returning to the input side (i.e., the power supply side). Generally speaking, to reduce electromagnetic interference (EMI), a low-pass filter composed of inductors and capacitors is usually arranged between the wall socket and the PFC circuit, so usually this energy (current) mainly recharges the capacitors of the low-pass filter.

9. When the primary-side current I1 is about to reach the predetermined condition (for example, determined based on time, the primary-side current I1, or the second voltage VS), the controller 116 turns off the return switch Q1.

10. The residual primary-side current I1 (in this step, the primary-side current I1 is a negative current) forces the first voltage VB to about −1 volt to keep flowing, and then the process returns to the first step mentioned above.

Moreover, if the AC voltage provided by the power supply apparatus 20 is in a negative half cycle, the neutral line N is positive, the live line L is negative, the first auxiliary switch Q3 is turned on, and the second auxiliary switch Q4 is blocked (namely, turned off). The left side of the resonant inductor Lr is a negative voltage source relative to the second voltage VS. The switch Q1 becomes the driving switch, and the switch Q2 becomes the return switch (namely, the roles of the two switches are exchanged).

Figure 6:
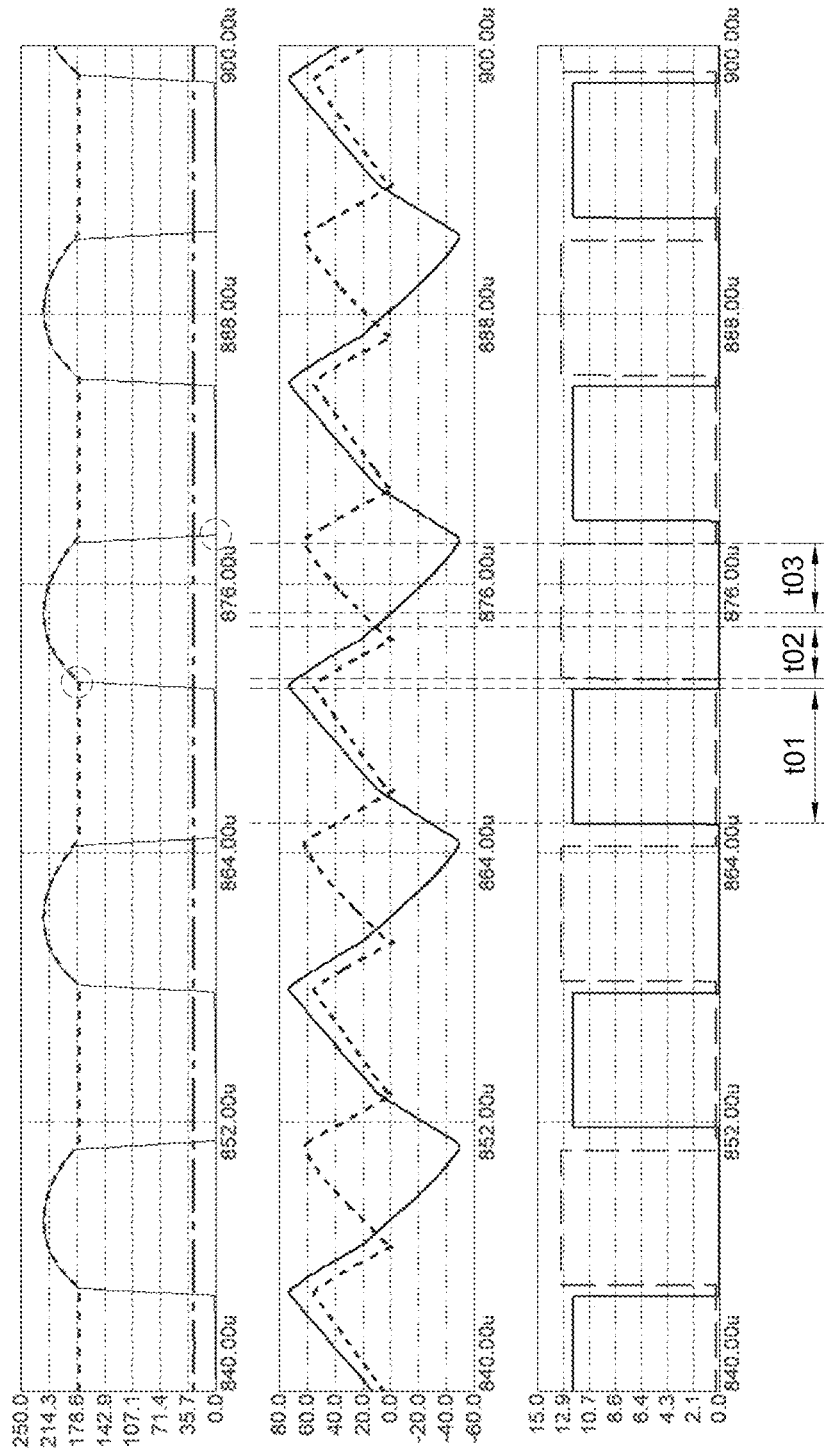
FIG. 6 shows a timing waveform diagram of the back-end energy storage isolation fly-back conversion apparatus operating in a step-down mode according to the fourth embodiment of the present disclosure.

FIG. 6 shows a timing waveform diagram of the back-end energy storage isolation fly-back conversion apparatus 10 operating in a step-down mode according to the fourth embodiment of the present disclosure, and also refer to FIG. 5. In FIG. 6, the first time interval t01 is a driving stage. In the driving stage, the driving switch Q2 is turned on, the power supply apparatus 20 supplies power, the primary-side winding Lm and the resonant inductor Lr store energy, and the energy is transmitted from the primary side to the secondary side (i.e., the secondary side receives energy). The second time interval t02 is a freewheeling stage. In the freewheeling stage, the return switch Q1 is turned on, and the current transmits energy and raises the voltage of the energy storage capacitor Cs. The third time interval t03 is a return stage. In the return stage, the return switch Q1 is turned on, and the current returns toward the power supply side and transmits energy to the secondary side.

Please refer to both FIG. 5 and FIG. 6. In FIG. 6, the top timing waveform diagram is a voltage timing diagram, wherein the solid line is the first voltage VB, which is a voltage driven by the half-bridge switches, the dotted line is the voltage of the energy storage capacitor Cs, and the single-pointed dotted line is the output voltage Vout (namely, the isolated low output voltage). The middle timing waveform diagram is a current timing diagram, wherein the solid line is a primary-side current I1 of the transformer T1, because of current-continuity, that is, the same current across the inductor of the bridge, and the dotted line is a primary-side current I2. The bottom timing waveform diagram is a control timing diagram, wherein the solid line is a signal of controlling the driving switch Q2, and the dotted line is a signal of controlling the return switch Q1.

Figure 7:
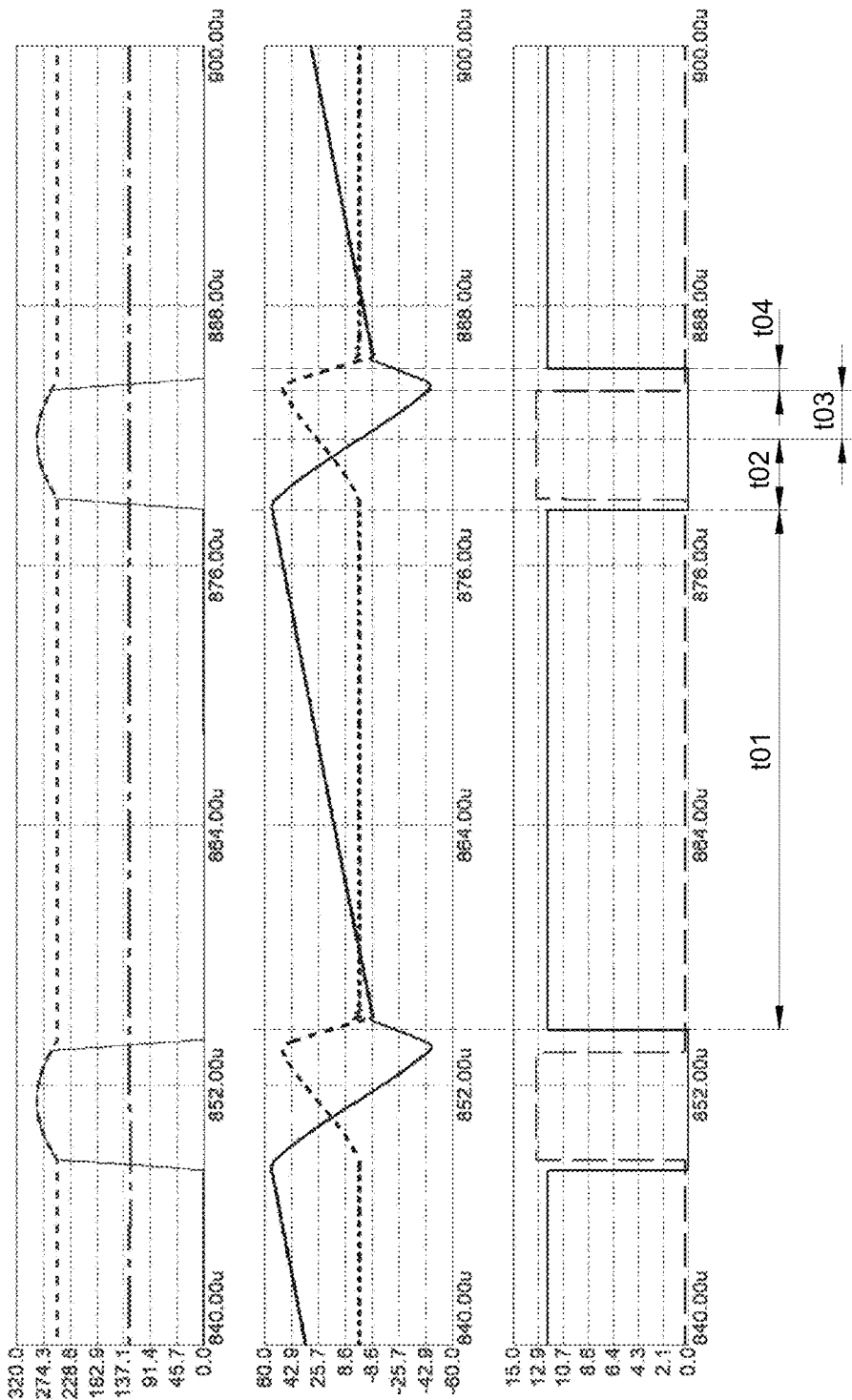
FIG. 7 shows a timing waveform diagram of the back-end energy storage isolation fly-back conversion apparatus operating in a step-up mode according to the fourth embodiment of the present disclosure.

FIG. 7 shows a timing waveform diagram of the back-end energy storage isolation fly-back conversion apparatus 10 operating in a step-up mode according to the fourth embodiment of the present disclosure. It is similar to FIG. 6, in FIG. 7, the top timing waveform diagram is a voltage timing diagram, wherein the solid line is the first voltage VB, the dotted line is the voltage of the energy storage capacitor Cs, and the single-pointed dotted line is the output voltage Vout. The middle timing waveform diagram is a current timing diagram, wherein the solid line is the primary-side current I1, and the dotted line is the secondary-side current I2. The bottom timing waveform diagram is a control timing diagram, wherein the solid line is a signal of controlling the driving switch Q2, and the dotted line is a signal of controlling the return switch Q1. FIG. 7 is also applied to the circuit in FIG. 5. In order to demonstrate the boost application of the circuit in FIG. 5, the output voltage Vout is increased/boosted in FIG. 7, and the input voltage provided by the power supply apparatus 20 is reduced. In other words, FIG. 7 demonstrates the conduction stage of the driving switch, since the input voltage is lower, there is no current on the secondary side, but the energy is still stored in the inductor. During the freewheeling stage, a part of the energy is stored in the energy storage capacitor Cs, and the other part of the energy is transmitted to the secondary side.

Please refer to both FIG. 5 and FIG. 7. In FIG. 7, the first time interval t01 is a driving stage. In the driving stage, the driving switch Q2 is turned on, the power supply apparatus 20 supplies power, the primary-side winding Lm and the resonant inductor Lr store energy, and the energy is not transmitted from the primary side to the secondary side (i.e., the secondary side does not receive energy). The second time interval t02 is an upper freewheeling stage. In the upper freewheeling stage, the return switch Q1 is turned on, the current transmits energy and raises the voltage of the energy storage capacitor Cs. The third time interval t03 is a return stage. When changing from the upper freewheeling stage to the return stage, the primary-side current I1 changes from positive to negative. In the return stage, the return switch Q1 is turned on, and the current returns toward the power supply side and transmits energy to the secondary side. The fourth time interval t04 is a lower freewheeling stage.

The boost mode of the fourth embodiment of the back-end energy storage isolation fly-back conversion apparatus 10 of the present disclosure includes the following steps in sequence.

1. The driving stage is performed. In the driving stage, the driving switch Q2 is turned on, and the input voltage is across the primary-side winding Lm of the transformer T1.

Since the input voltage is lower than the output voltage, only the inductor stores energy and the secondary side has no current.

2. The controller 116 turns off the driving switch Q2 based on the primary-side current I1 reaching a predetermined value or the switch reaching a predetermined time.

3. In an upper freewheeling stage. The freewheeling boosted energy turns on the body diode of the return switch Q1 (a condition for zero voltage switching). The fly-back electromotive force charges the energy storage capacitor Cs and also transmits energy to the secondary side.

4. In a return stage. When the return switch Q1 is turned on and the freewheeling current exhausts the inductance energy, the direction of the primary-side current I1 is reversed, the voltage of the energy storage capacitor Cs drives the reverse current to charge the secondary side, and the current returns toward the power supply side.

5. The system turns off the return switch Q1 based on predetermined conditions (for example, current or time).

6. In a lower freewheeling stage. The freewheeling current of the inductor turns on the body diode of the driving switch Q2 (a condition for zero voltage switching), and the freewheeling current decreases rapidly.

7. Return to the driving stage.

The circuit of the fourth embodiment of the present disclosure includes the following effects, characteristics, and advantages:

1. The present disclosure provides the innovative boost-type back-end energy storage architecture; the energy storage capacitor Cs may adjust the driving voltage to the secondary side, so as to achieve the driving function at extremely low voltage.

2. The large capacitor (namely, the output capacitor Cout) is arranged on the secondary side, so that the inrush current is eliminated.

3. The present disclosure may reliably achieve the zero voltage switching, as shown by the dotted circle in the top timing waveform diagram in FIG. 6 and FIG. 7.

4. The present disclosure may provide the low voltage output.

5. Both forward and fly-back transfer energy to the secondary side, and the usage efficiency of the time and component is higher.

6. The present disclosure may step up (boost) and step down (buck) the voltage in a wide range to be more suitable for the power factor correction. The present disclosure discloses the buck-boost type (while the conventional converter is only a boost-type or a buck-type), so the output of the PFC may be set at a convenient voltage.

7. This architecture achieves a Totem-Pole PFC with low-voltage isolated output (which is not achieved by the conventional converters), that is, by controlling the timing (for example, the duty cycles) of these switches, the energy may be efficiently and controllably transmitted from the primary side (i.e., the power input side) to the second side (i.e., the output side) regardless of the input voltage being higher or lower than the output voltage.

Figure 8:
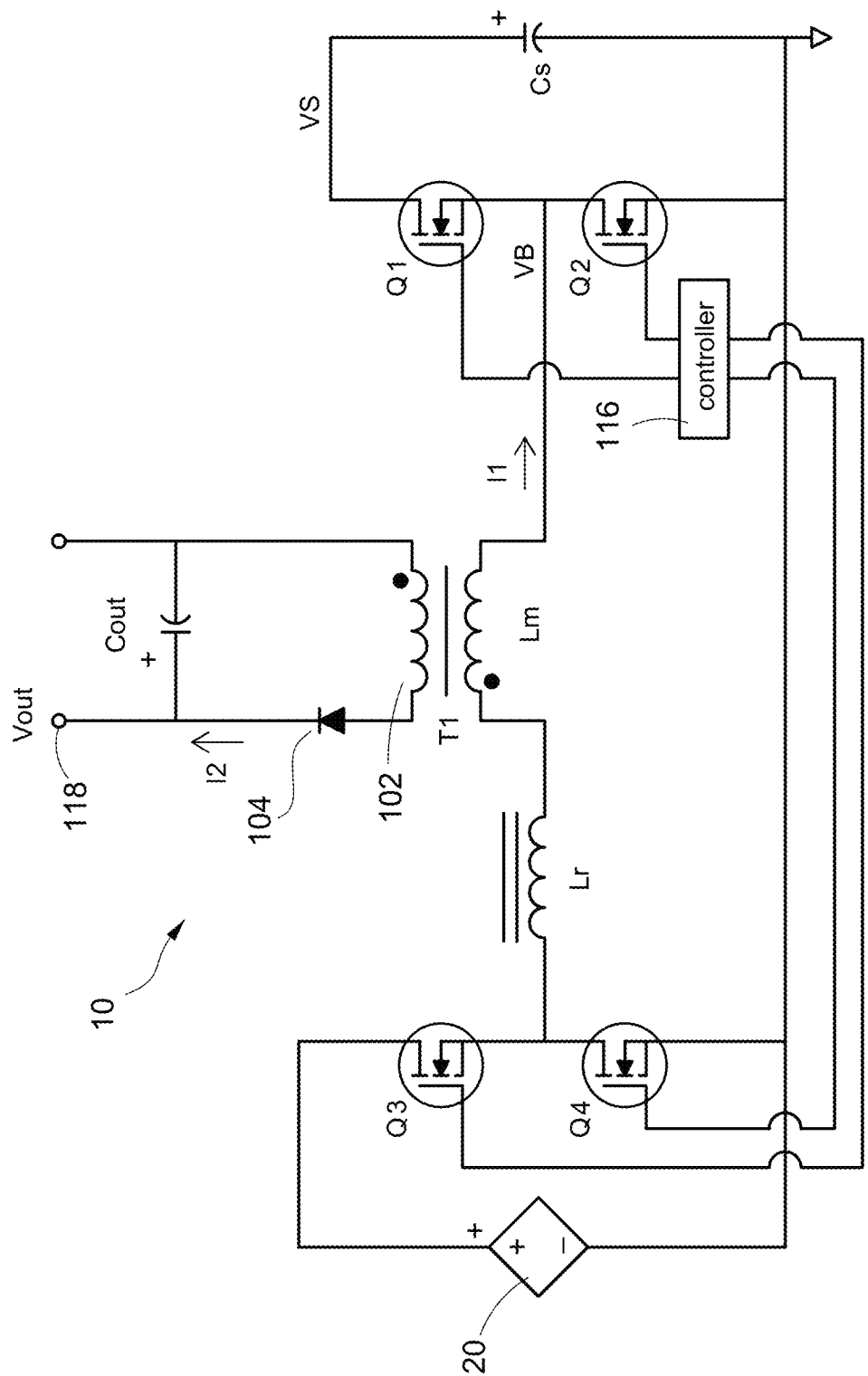
FIG. 8 shows a circuit block diagram of the back-end energy storage isolation fly-back conversion apparatus according to a fifth embodiment of the present disclosure.

FIG. 8 shows a circuit block diagram of the back-end energy storage isolation fly-back conversion apparatus 10 according to a fifth embodiment of the present disclosure. The descriptions of the elements shown in FIG. 8 which are the same as the elements shown in FIG. 1 are not repeated here for brevity. Moreover, the back-end energy storage isolation fly-back conversion apparatus 10 further includes a first auxiliary switch Q3 and a second auxiliary switch Q4. The first auxiliary switch Q3 is electrically connected to the resonant inductor Lr. The second auxiliary switch Q4 is electrically connected to the first auxiliary switch Q3 and the resonant inductor Lr.

The circuit in FIG. 8 is a double tower type, which may be also referred to as a double-tower fly-back (abbreviated as DTFB). The DTFB is composed of a buck-like circuit arranged in front of the above-mentioned basic type (similar to the boost structure) of the present disclosure to form an isolated buck-boost DC-DC converter. The half bridge at the power supply side is separated from the half bridge at the back-end energy storage side (hence is referred to as the "double towers"). The two half bridges of DTFB are different from the general bridges, which provide the boost effect due to the bridge separation. The biggest advantage of the double-tower circuit is that the energy storage capacitor Cs may be used to maximize the flexibility of the use of the driving voltage (wherein the primary side stores energy in the inductor) and the discharging voltage (wherein the energy is transferred to the secondary side).

Figure 9:
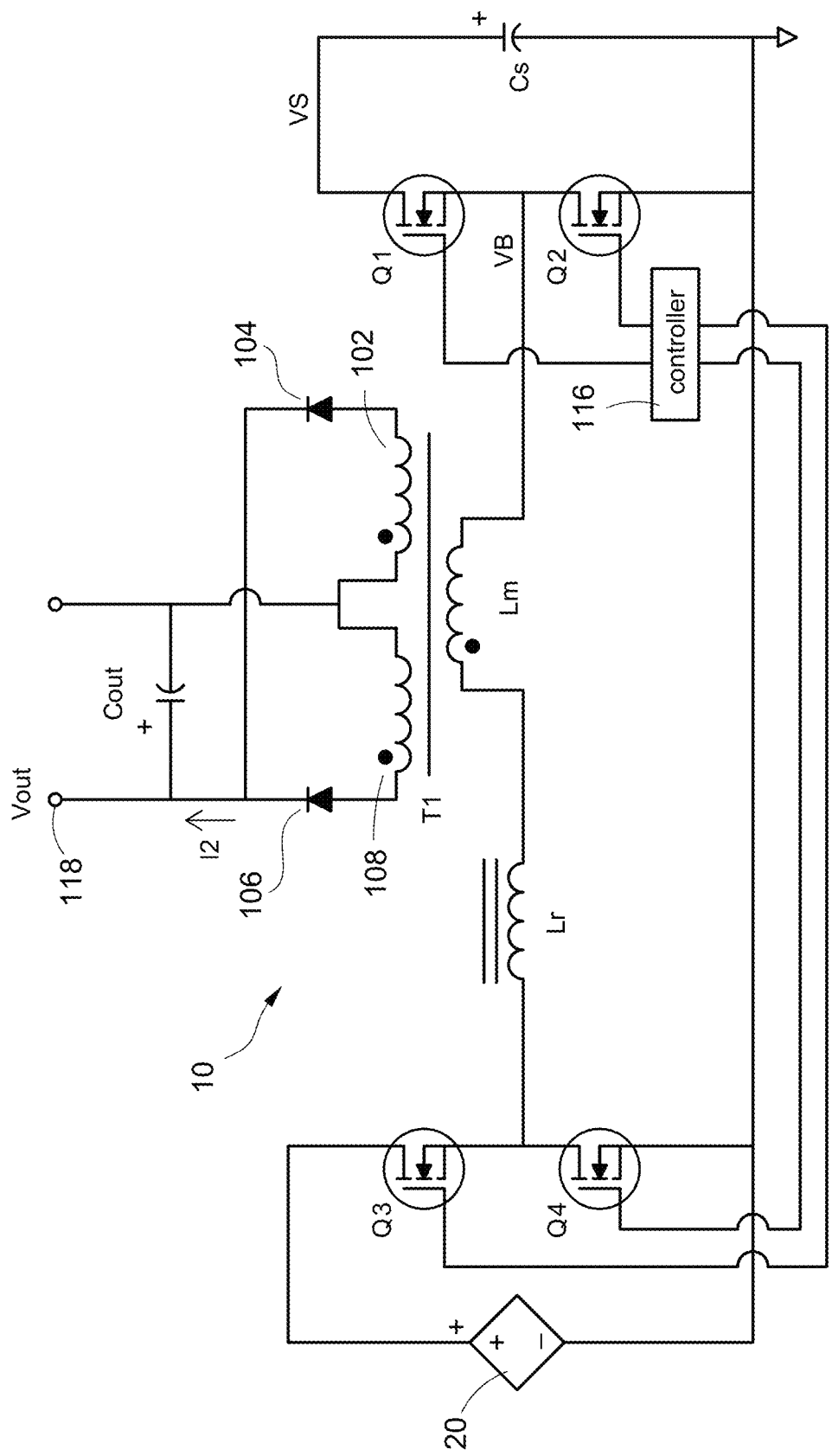
FIG. 9 shows a circuit block diagram of the back-end energy storage isolation fly-back conversion apparatus according to a sixth embodiment of the present disclosure.

FIG. 9 shows a circuit block diagram of the back-end energy storage isolation fly-back conversion apparatus 10 according to a sixth embodiment of the present disclosure. The descriptions of the elements shown in FIG. 9 which are the same as the elements shown in FIG. 8 are not repeated here for brevity. Moreover, the back-end energy storage isolation fly-back conversion apparatus 10 further includes a second rectifier 106 electrically connected to the output capacitor Cout and the first rectifier 104. The transformer T1 further includes a secondary-side second winding 108 electrically connected to the second rectifier 106. The circuit in FIG. 9 may be referred to as a full-wave double-tower fly-back, namely, a double-tower resonant switching converter, which has the added advantage of the full-wave output.

Figure 10:
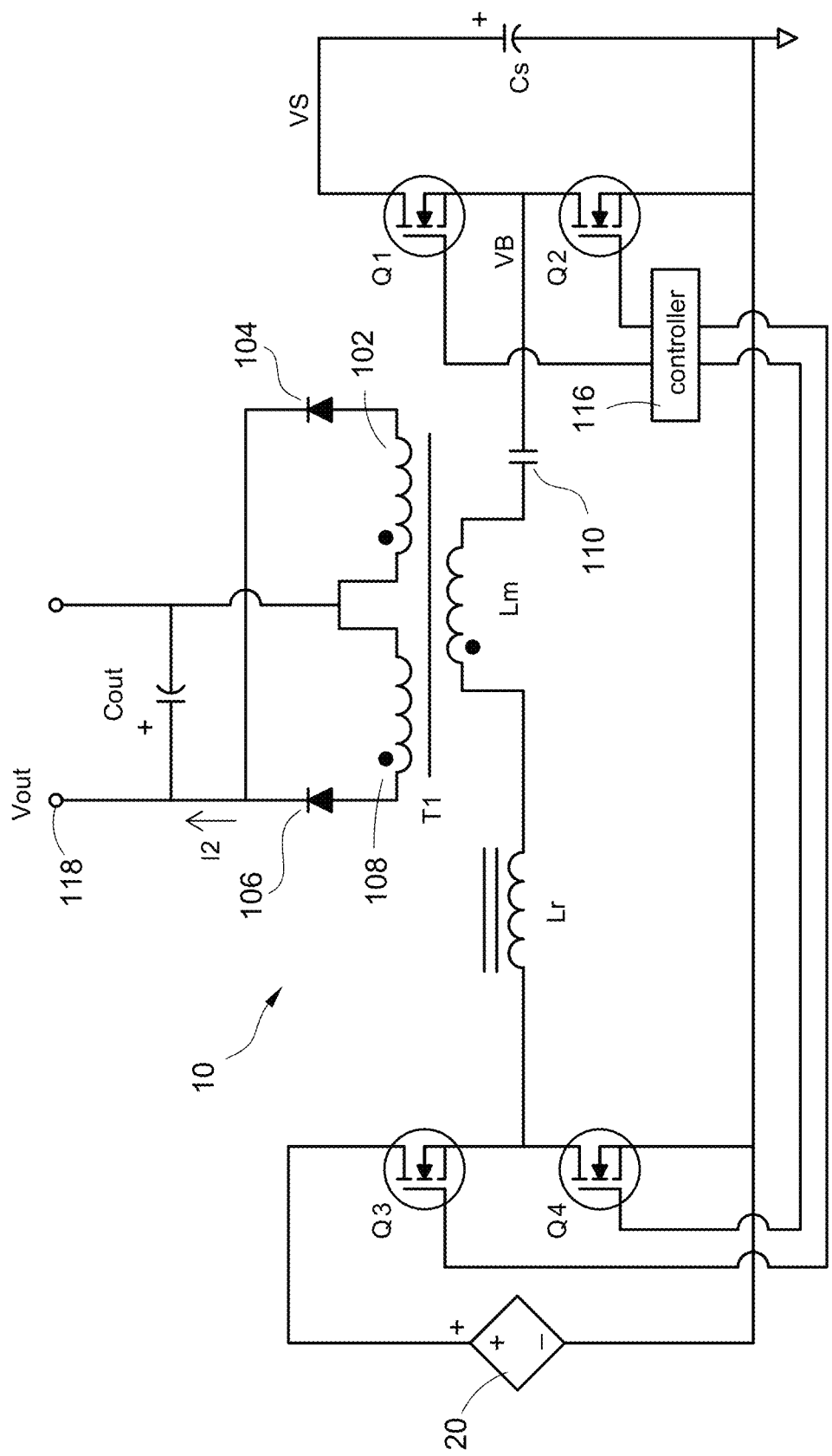
FIG. 10 shows a circuit block diagram of the back-end energy storage isolation fly-back conversion apparatus according to a seventh embodiment of the present disclosure.

FIG. 10 shows a circuit block diagram of the back-end energy storage isolation fly-back conversion apparatus 10 according to a seventh embodiment of the present disclosure. The descriptions of the elements shown in FIG. 10 which are the same as the elements shown in FIG. 9 are not repeated here for brevity. Moreover, the back-end energy storage isolation fly-back conversion apparatus 10 further includes a primary-side capacitor 110 electrically connected to the return switch Q1, the driving switch Q2, and the primary-side winding Lm. FIG. 10 is a resonant double-tower fly-back, which may be referred to as a double-tower resonant switching converter, which inherits the advantages of high efficiency and low noise of the resonant converter, and combines with the feature of storage-boost, thereby enhancing the control flexibility, and directly enabling the power factor correction.

Figure 11:
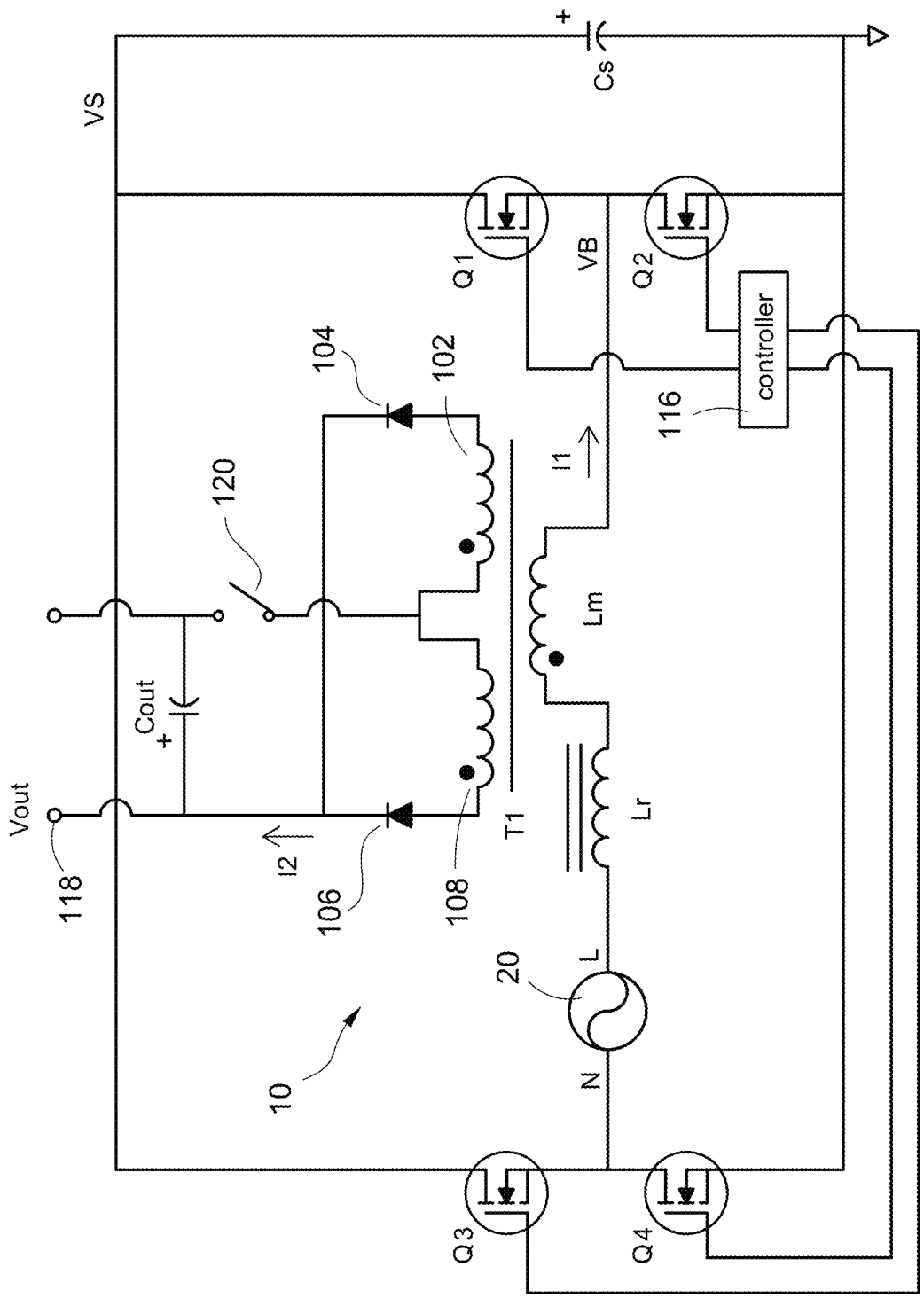
FIG. 11 shows a circuit block diagram of the back-end energy storage isolation fly-back conversion apparatus according to an eighth embodiment of the present disclosure.

FIG. 11 shows a circuit block diagram of the back-end energy storage isolation fly-back conversion apparatus 10 according to an eighth embodiment of the present disclosure. The descriptions of the elements shown in FIG. 11 which are the same as the elements shown in FIG. 5 are not repeated here for brevity. Moreover, the back-end energy storage isolation fly-back conversion apparatus 10 further includes a secondary-side switch 120 electrically connected to the output capacitor Cout, the secondary-side first winding 102, and the secondary-side second winding 108. In FIG. 11, the secondary-side switch 120 is added on the secondary side to block the current during the driving stage of the primary side and force the primary side to store energy in the magnetic core. Since the rectifier is already provided on the secondary side, the secondary-side switch 120 only needs to be provided in the opposite direction to the direction of rectification. In one embodiment, the rectifier diodes may be replaced by transistor switches (for example, MOSFET, GaN, SiC, and so on).

Figure 12:
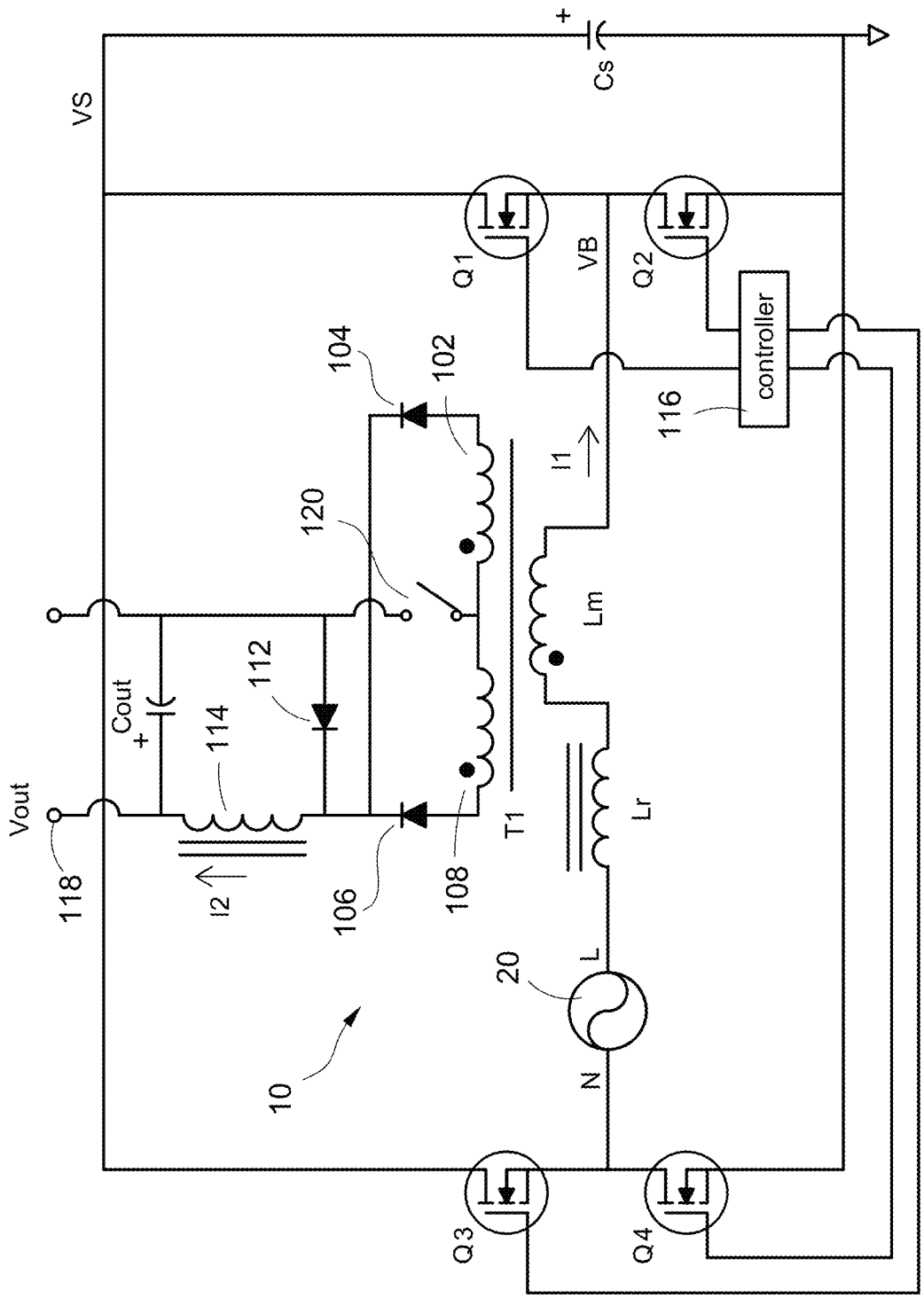
FIG. 12 shows a circuit block diagram of the back-end energy storage isolation fly-back conversion apparatus according to a ninth embodiment of the present disclosure.

FIG. 12 shows a circuit block diagram of the back-end energy storage isolation fly-back conversion apparatus 10 according to a ninth embodiment of the present disclosure. The descriptions of the elements shown in FIG. 12 which are the same as the elements shown in FIG. 11 are not repeated here for brevity. Moreover, the back-end energy storage isolation fly-back conversion apparatus 10 further includes a secondary-side inductor 114 electrically connected to the first rectifier 104, the second rectifier 106, and the output capacitor Cout. In FIG. 12, the secondary-side inductor 114 is arranged on the secondary side to receive the driving voltage of the primary side, for example, to control the rate of change of the secondary-side current I2. Since the secondary-side inductor 114 and the resonant inductor Lr can functionally substitute each other to some extent, the designer may arrange them flexibly. Besides, in addition to the secondary-side inductor 114, the secondary-side switch 120 as shown in FIG. 11 may also be arranged. If the secondary-side inductor 114 and the secondary-side switch 120 are to be both arranged, a third rectifier 112 may also be further arranged to provide a freewheeling path for the secondary-side inductor 114. That is, the back-end energy storage isolation fly-back conversion apparatus 10 may further include the third rectifier 112 electrically connected to the first rectifier 104, the second rectifier 106, and the secondary-side inductor 114.

Figure 13:
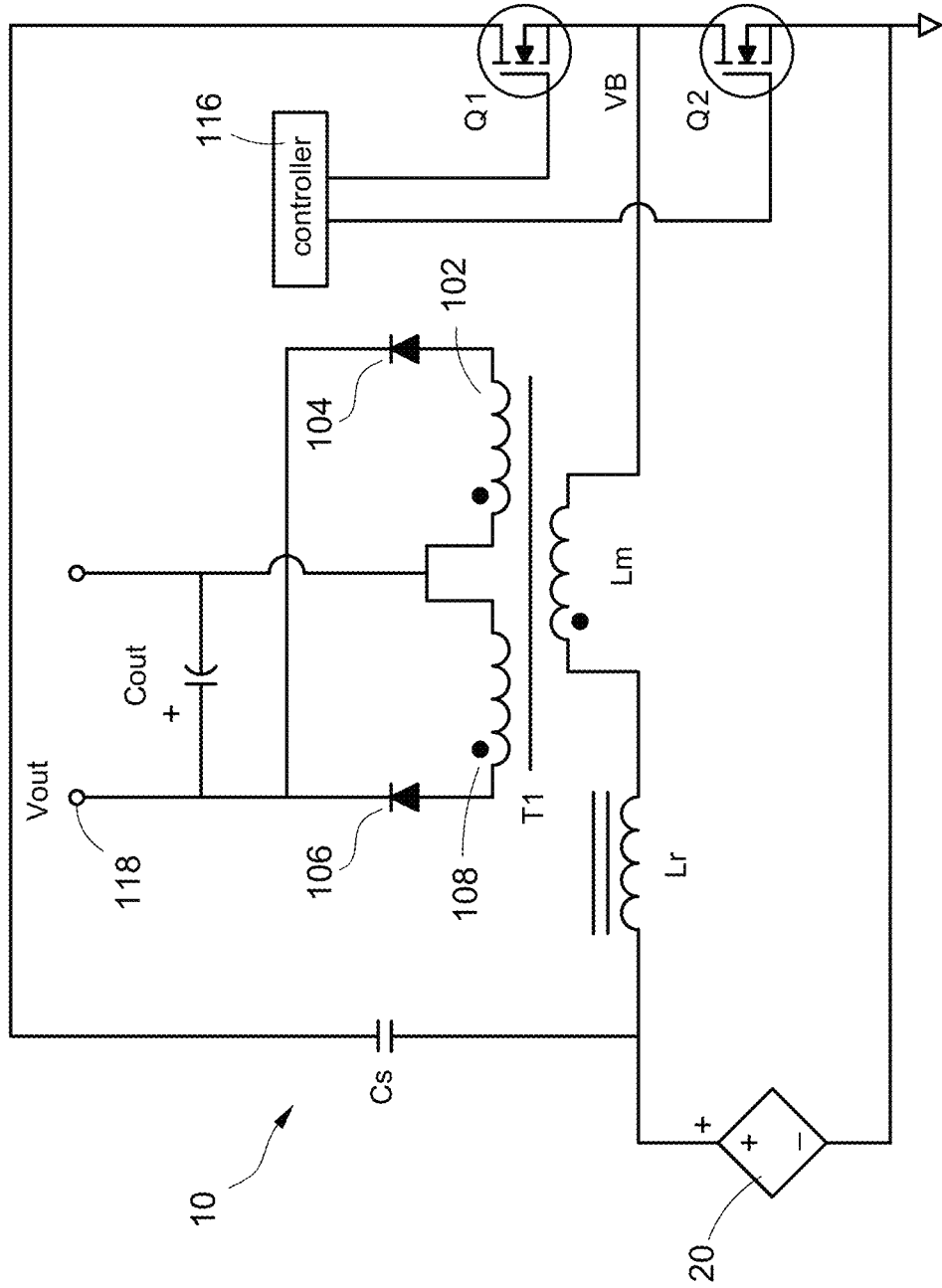
FIG. 13 shows a circuit block diagram of the back-end energy storage isolation fly-back conversion apparatus according to a tenth embodiment of the present disclosure.

FIG. 13 shows a circuit block diagram of the back-end energy storage isolation fly-back conversion apparatus 10 according to a tenth embodiment of the present disclosure. The descriptions of the elements shown in FIG. 13 which are the same as the elements shown in FIG. 4 are not repeated here for brevity. In FIG. 13, only the back-end energy storage capacitor Cs is arranged above the power supply, and therefore the advantage of this structure is that the voltage across the capacitor Cs itself will be lower than that in FIG. 4. However, since the energy storage capacitor Cs is arranged on the power supply side, this structure may not be suitable for the Totem-Pole PFC.

To sum up, the present disclosure provides the innovative boost-type back-end energy storage architecture. The energy storage capacitor Cs may adjust the driving voltage to the secondary side, so as to achieve the driving function at extremely low voltage (of power). The present disclosure may step up (boost) and step down (buck) the voltage in a wide range to be more suitable for the power factor correction. The present disclosure discloses the buck-boost type (while the conventional converter is only a boost-type or a buck-type), so the output of the PFC may be set at a convenient voltage. The inductor of the present disclosure directly connects to the input power, so that the Totem-Pole PFC may be achieved (which is not achieved by the conventional converters), that is, by controlling the timing (for example, the duty cycles) of these switches, the energy may be efficiently and controllably transmitted from the primary side (i.e., the power input side) to the second side (i.e., the output side) regardless of the input voltage being higher or lower than the output voltage.

Although the present disclosure has been described with reference to the embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A back-end energy storage isolation fly-back conversion apparatus (10) comprising:
   a return switch (Q1);
   a driving switch (Q2) electrically connected to the return switch (Q1);
   an energy storage capacitor (Cs) electrically connected to the return switch (Q1);
   a transformer (T1) electrically connected to the return switch (Q1) and the driving switch (Q2), and the transformer (T1) comprising a primary-side winding (Lm) and a secondary-side first winding (102);
   a resonant inductor (Lr) electrically connected to the primary-side winding (Lm);
   a first rectifier (104) electrically connected to the secondary-side first winding (102);
   an output capacitor (Cout) electrically connected to the first rectifier (104); and
   a controller (116) electrically connected to the return switch (Q1) and the driving switch (Q2);
   wherein the return switch (Q1) is turned on by the controller (116), so that the energy storage capacitor (Cs) is charged by a primary-side current (I1) flowing through the resonant inductor (Lr), the primary-side winding (Lm), and the return switch (Q1), and the secondary-side first winding (102) is powered by the primary-side current (I1); when the primary-side current (I1) becomes negative, the energy storage capacitor (Cs) discharges through the return switch (Q1) and the primary-side winding (Lm) and continuously supplies power to the secondary-side first winding (102).

2. The back-end energy storage isolation fly-back conversion apparatus (10) of claim 1, further comprising:
   a second rectifier (106) electrically connected to the output capacitor (Cout) and the first rectifier (104),
   wherein the transformer (T1) further comprises:
   a secondary-side second winding (108) electrically connected to the second rectifier (106).

3. The back-end energy storage isolation fly-back conversion apparatus (10) of claim 2, further comprising:
   a first auxiliary switch (Q3) electrically connected to the return switch (Q1) and the energy storage capacitor (Cs); and
   a second auxiliary switch (Q4) electrically connected to the first auxiliary switch (Q3).

4. The back-end energy storage isolation fly-back conversion apparatus (10) of claim 3, further comprising:
   a secondary-side switch (120) electrically connected to the output capacitor (Cout), the secondary-side first winding (102), and the secondary-side second winding (108).

5. The back-end energy storage isolation fly-back conversion apparatus (10) of claim 4, further comprising:
   a third rectifier (112) electrically connected to the first rectifier (104) and the second rectifier (106); and
   a secondary-side inductor (114) electrically connected to the first rectifier (104), the second rectifier (106), the third rectifier (112), and the output capacitor (Cout).

6. The back-end energy storage isolation fly-back conversion apparatus (10) of claim 1, further comprising:
   a first auxiliary switch (Q3) electrically connected to the resonant inductor (Lr); and a second auxiliary switch (Q4) electrically connected to the first auxiliary switch (Q3) and the resonant inductor (Lr).

7. The back-end energy storage isolation fly-back conversion apparatus (10) of claim 6, further comprising:
   a second rectifier (106) electrically connected to the output capacitor (Cout) and the first rectifier (104),
   wherein the transformer (T1) further comprises:
   a secondary-side second winding (108) electrically connected to the second rectifier (106).

8. The back-end energy storage isolation fly-back conversion apparatus (10) of claim 7, further comprising:
   a primary-side capacitor (110) electrically connected to the return switch (Q1), the driving switch (Q2), and the primary-side winding (Lm).

9. The back-end energy storage isolation fly-back conversion apparatus (10) of claim 1, further comprising:
   a power output end (118) electrically connected to the first rectifier (104) and the output capacitor (Cout).

* * * * *